J. SHAW.
INTERNAL COMBUSTION ENGINE.
APPLICATION FILED APR. 9, 1915.
1,186,952.
Patented June 13, 1916.
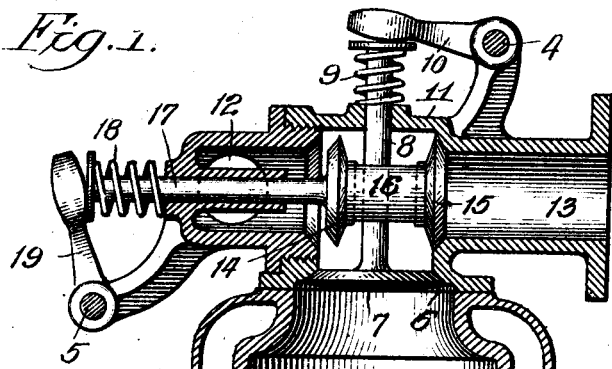
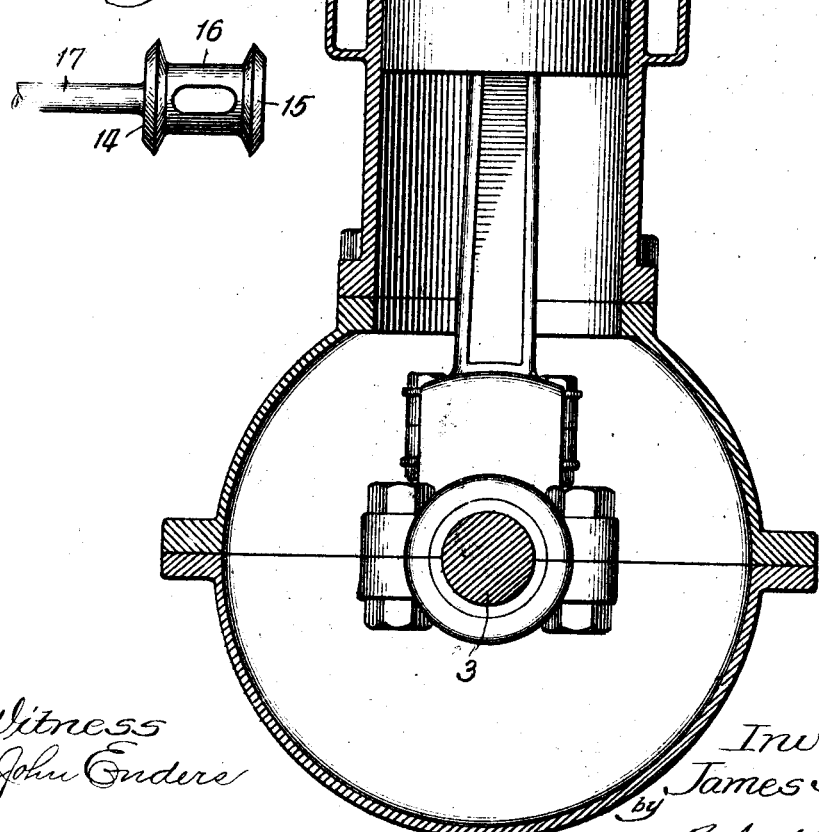
Witness
John Enders
Inventor:
James Shaw,
by Robert Burns
Atty

UNITED STATES PATENT OFFICE.

JAMES SHAW, OF LODI, CALIFORNIA.

INTERNAL-COMBUSTION ENGINE.

1,186,952.  Specification of Letters Patent.  Patented June 13, 1916.

Application filed April 9, 1915. Serial No. 20,107.

*To all whom it may concern:*

Be it known that I, JAMES SHAW, a citizen of the United States of America, and a resident of Lodi, in the county of San Joaquin, State of California, have invented certain new and useful Improvements in Internal-Combustion Engines, of which the following is a specification.

This invention relates to that type of valve mechanisms for internal combustion engines in which the inflow of gaseous fuel and the outflow of the exploded charge is controlled and regulated through a single inlet-outlet port or passage to the combustion chamber of the engine. And the present improvement has for its object to provide a compact and efficient structural formation and association of parts therein the single passage or port connecting with the combustion chamber is controlled by a single puppet valve to admit the gaseous fuel charge into said combustion chamber and to permit the escape of the exploded charge therefrom, and wherein the intake passage for the gaseous fuel and the out-take passage for the exploded charges are compactly located at opposite sides of the aforesaid passage of the combustion chamber and controlled by a duplex valve to attain a minimum loss of gaseous fuel due to excessive "dead" space in the inclosing casing of said duplex valve, all as will hereinafter more fully appear.

In the accompanying drawings:—Figure 1, is a vertical sectional elevation of an internal combustion engine to which the preferred form of the present invention is applied. Fig. 2, is a detail plan view of the duplex valve which controls the fuel inlet and exploded charge outlet passages of the engine.

Similar reference numerals indicate like parts in the several views.

Referring to the drawings, 1 designates the engine cylinder, 2 the piston, and 3 the main shaft of an ordinary four-cycle internal combustion engine.

4 designates a primary rock-shaft, and 5 a secondary rock-shaft, both journaled in associated relation to the engine cylinder 1, and receiving intermittent motion through any usual cam mechanism and reducing gearing disposed intermediate of said rock-shafts and the main shaft 2 of the engine.
The rock-shaft 4 is adapted to intermittently operate the hereinafter described inlet-outlet valve of the combustion chamber of the engine, and hold the same open during the outlet of the exhaust from the combustion chamber and the inlet of gaseous fuel to said chamber, and to permit said valve to close during the compression and explosion strokes of the piston 2 of the engine. While the rock shaft 5 is adapted to intermittently operate the hereinafter described duplex fuel inlet and exhaust outlet valve in a chamber disposed beyond the above mentioned inlet-outlet valve of the combustion chamber of the engine at intervals, during the explosion and exhaust strokes of the engine piston, so that said duplex valve in one position will permit a passage of gaseous fuel to the combustion chamber and close the associated exhaust passage, and in the other position said valve will close the gaseous fuel passage and open the associated exhaust passage.

6 designates the single fuel inlet and exhaust outlet port or passage to and from the combustion chamber of the engine cylinder 1, and positioned in any usual manner with relation to said chamber, preferably at top as shown in Fig. 1.

7 designates an inwardly opening puppet valve controlling the port or passage 6 aforesaid, and having an operating stem 8 passing through the hereinafter described chamber for operative connection with the aforesaid rock-shaft 4.

9 designates a spring associated with the valve stem 8, and tending to move and yieldingly hold the valve 7 to its seat.

10 designates a rock-arm carried by the rock-shaft 4 and having operative engagement with the outer end of the valve stem 8, aforesaid.

11 designates a casing associated with the aforesaid valve 7 with its chamber or cavity in communication with the port or passage 6 controlled by said valve.

12 designates the fuel inlet neck, and 13 designates the exhaust outlet neck, both communicating with the chamber or cavity of the casing 11, aforesaid. In the preferred form of the invention shown in Fig. 1, the necks 12 and 13 are arranged in axial alinement one with the other, and are formed at their inner ends with seats for the duplex reciprocating puppet valve now to be described.

14 and 15 designate a pair of inwardly opening valve heads, individual to the valve seats of the necks 12 and 13 aforesaid, and connected together in spaced relation by an intermediate shank 16. The valve heads so connected are provided with an operating stem 17 passing preferably through the fuel inlet neck 12, for operative connection with the rock-shaft 5, above described.

18 designates a spring associated with the valve stem 17 and tending to move and yieldingly hold the above described duplex valve structure to its position to the left in Fig. 1.

19 designates a rock-arm carried by the rock-shaft 5 and having operative engagement with the outer end of the valve stem 17, aforesaid.

In the operation of the duplex valve above described, a movement of the same to the right in Fig. 1, will open the fuel inlet neck or passage 12 to the chamber of the casing 11, and close the exhaust outlet neck or passage 12 to the chamber of the casing 11, and close the exhaust outlet neck or passage 13 to said chamber, while in a movement to the left said duplex valve will close said fuel inlet neck or passage 12, and open the exhaust outlet neck or passage 13. The main valve 7 operates in unison with said duplex valve structure to intermittently open the combustion chamber of the engine cylinder 1 to the chamber of said casing 11, to admit in one instance an inlet of gaseous fuel, and in the other instance to permit an outlet of the exploded gases from the combustion chamber.

Having thus fully described my said invention what I claim as new and desire to secure by Letters Patent, is:—

In an internal combustion engine, the combination of an engine cylinder having an inlet-outlet opening, an inwardly opening puppet valve associated with said opening, an operating stem for said valve, a chambered casing associated with said inlet-outlet opening and having inlet and outlet necks in alined relation and disposed at opposite sides of said inlet-outlet opening and its valve, a reciprocating valve arranged in said casing and provided with valve heads in spaced relation, said valve heads being individual to said inlet and outlet necks and adapted to alternately register the same with the interior of the casing, and an intermediate connecting portion of said valve heads formed with an opening for the passage of the operating stem of the aforesaid puppet valve, substantially as set forth.

Signed at Chicago, Illinois, this 6th day of April, 1915.

JAMES SHAW.